United States Patent
Kreiner et al.

(10) Patent No.: US 7,000,982 B2
(45) Date of Patent: Feb. 21, 2006

(54) PROCESS FOR CONTROLLING A CLOSING DEVICE IN A MOTOR VEHICLE

(75) Inventors: Steffen Kreiner, Esslingen (DE); Hermann Schneider, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/821,205

(22) Filed: Apr. 9, 2004

(65) Prior Publication Data

US 2005/0023867 A1    Feb. 3, 2005

(30) Foreign Application Priority Data

Apr. 11, 2003    (DE) ................ 103 16 594

(51) Int. Cl.
*B60J 7/057*    (2006.01)

(52) U.S. Cl. .............. 296/223; 318/466; 701/49
(58) Field of Classification Search ............... None
See application file for complete search history.

(56) References Cited

U.S. PATENT DOCUMENTS

| | | | |
|---|---|---|---|
| 6,219,599 B1 * | 4/2001 | Lamm et al. ............... 701/36 |
| 6,404,158 B1 * | 6/2002 | Boisvert et al. ............ 318/469 |
| 6,592,178 B1 * | 7/2003 | Schober et al. ............. 296/214 |
| 6,630,808 B1 | 10/2003 | Kliffken ..................... 318/466 |
| 2004/0008001 A1 * | 1/2004 | Kikuta et al. ............... 318/466 |

FOREIGN PATENT DOCUMENTS

| | | |
|---|---|---|
| DE | 4020351 C2 | 5/1992 |
| DE | 4416803 A1 | 11/1994 |
| DE | 19619932 A1 | 11/1997 |
| DE | 19745597 A1 | 4/1999 |
| DE | 19845820 A1 | 4/2000 |
| DE | 10149578 A1 | 4/2003 |
| WO | WO 97/39509 | 10/1997 |

* cited by examiner

Primary Examiner—Dennis H. Pedder
(74) Attorney, Agent, or Firm—Crowell & Moring LLP

(57) ABSTRACT

In a process for controlling a closing device in a motor vehicle driven by an electric motor, in particular for controlling a motor vehicle sunroof, to protect a body part from being crushed during a closing motion, a closing resistance variable is detected. The closing resistance variable is characteristic of a force counteracting the closing motion, and is used to determine whether a crush situation exists. For this purpose, an additional auxiliary variable indicative of wind load forces at a certain speed is used. If a crush situation exists, a protective measure is initiated.

12 Claims, 2 Drawing Sheets

PROCESS FOR CONTROLLING A CLOSING DEVICE IN A MOTOR VEHICLE

This application claims the priority of German application 103 16 594.0, filed Apr. 11, 2003, the disclosure of which is expressly incorporated by reference herein.

BACKGROUND AND SUMMARY OF THE INVENTION

This invention concerns a process for controlling a closing or locking device in a motor vehicle, in particular for controlling a motor vehicle sunroof. When closing the closing device by means of power control, it is important to prevent an object or a body part of a vehicle passenger from becoming crushed by the closing motion of a closing means of the closing device. For this purpose, a crush protection function is provided in power-controlled closing devices.

Monitoring of the closing process of a sunroof or a power window in a motor vehicle, in order to determine a crush situation, i.e. the crushing of a body part caused by the closing process, is disclosed in German document DE 196 19 932 A1. For this purpose, the rpm of the electromotor drive or the opening or closing speed of the sunroof or power window are detected. If it is determined that a crush situation exists, the driving motor of the sunroof is stopped or the direction of motion thereof is reversed. In order to avoid a mistaken determination of a crush situation, an acceleration acting in the vertical direction of the vehicle, which can be caused, for example, by road damage, is detected and used to determine a crush situation.

A similar process is disclosed in German document DE 197 45 597 A1. If it is determined that a crush situation exists for a locking device in a motor vehicle, the locking operation is interrupted or reversed. As examples of locking devices, a sunroof or a power window are mentioned, wherein the locking means, in the case of a power window, is the pane and, in the case of a sunroof, the sliding cover. During a closing process, a closing resistance value is detected, which is characteristic of a force counteracting the closing motion of the locking means. This closing resistance value is used to determine whether a crush situation exists. Another variable that is used to reduce false triggering, as part of the process of determining whether a crush situation exists, is the acceleration acting upon the vehicle body, which is detected by means of an acceleration sensor. If, for example, travel through a pothole leads to a greater acceleration of the vehicle, its effect on the closing resistance value should be taken into consideration and not should lead to the mistaken determination of a crush situation. In order to recognize another critical case for mistaken determination of a crush situation, such as the forceful closure of a vehicle door, the signal of a door switch is used to determine a crush situation.

Proceeding from the state of the art known from German document DE 197 45 597 A1, one object of the invention is to determine a crush situation more reliably and reduce false triggering of a crush protection function, whereby the crushing of body parts is to be prevented safely. This object is achieved by means of a process as claimed.

The force required for closing a closing means of a closing device, such as a window pane of a power window or a sliding cover of a sunroof, is heavily dependent upon the wind load forces exerted on the closing means. The wind load forces in turn are heavily dependent upon the wind speed, and particularly the travel wind speed during the driving operation of a vehicle, and hence are dependent upon the travel speed of the vehicle.

Moreover, the shape of the vehicle and the shape of objects attached to the vehicle significantly influence the wind load forces exerted on the vehicle and on the closing means of a closing device. Examples of objects that are attached to the vehicle include a ski box attached to the roof, a roof container, a bicycle rack, or a trailer.

In a process according to the invention for controlling a closing device in a motor vehicle, a closing resistance value is detected for protection against the crushing of a body part during the closing motion of a closing means of a closing device. The closing resistance value is characteristic of a force acting against the closing motion of the closing means. Should it be determined, through the use of the closing resistance value and an additional auxiliary variable indicative of the wind load forces occurring at a certain speed, that a crush situation exists, a protective measure is initiated. In particular, the closing operation is delayed, interrupted or reversed.

A benefit of a process according to the invention is that the existence of a crush situation can be determined more reliably when using the auxiliary variable indicative of the wind load forces. In this way, on one hand, the crushing of a body part can be safely prevented, and on the other hand, the number of false triggers of the crush protection function can be reduced. Another benefit resulting from this is that the crush protection function can be triggered by even a small crushing force. The auxiliary variable enables exact determination of a closing resistance value to be expected during a closing operation. In this way, a limit value for the closing resistance variable or a limit value for the variable determined through the use of the closing resistance value can be very precisely adapted to the existing conditions affecting the closing resistance, allowing the determination of a crush situation when the relevant variable exceeds a limit value.

In one embodiment of the process, the auxiliary variable is a variable indicative of a change in the wind load forces exerted on the closing means, whereby the change is affected by a modification to the vehicle. What is detected, for example, is whether or in which way a modification to the vehicle or to a vehicle attachment that affects the wind load forces has occurred; this information is then stored as the auxiliary variable. Examples of such modifications to the vehicle are the extension or retraction of retractable headlights, the extension or retraction of a retractable spoiler, the extension, retraction or tilting of a draft stop, the attachment or removal of a removable spoiler or paneling or the adjustment, attachment or removal of another component which affects wind forces. A variable indicating such a modification can be used directly as the auxiliary variable or can be used to determine an auxiliary variable.

Alternatively, or additionally, a load of the vehicle can be detected and used to determine the auxiliary variable. The load of a vehicle can affect the wind load forces exerted on the vehicle. This particularly applies when the load is exposed to the relative wind, as is the case, for example, for vehicles with a platform, open utility vehicles or pick-ups. Moreover, the weight and the distribution of the load can affect the wind load forces. Modified wind load forces result when the vehicle body exhibits different compression behavior due to the load and, for example, is lower, i.e. is closer to the road surface due to stronger compression. Likewise, the wind load forces change when, due to an uneven load, the tilt angle of the vehicle body in relation to the road changes, as compared to the unloaded state.

In a further development of the process, what is detected is whether an attachment on or above the vehicle exists. The detected existence of a vehicle attachment is used to determine the auxiliary variable, which is used to determine a crush situation. In particular, a variable that directly indicates the existence of a vehicle attachment on or above the vehicle is used as the auxiliary variable. Any objects that affect the exterior shape of the vehicle or the relative wind current around the vehicle and are connected to the vehicle can be detected as vehicle attachments on or above the vehicle. For example, a spoiler can be detected as an attachment on a vehicle, or a roof rack or roof container as an attachment above the vehicle.

Detection of an attachment on or above the vehicle preferably occurs by means of a sensor provided for this purpose. Examples of sensors provided for detecting an attachment on or above the vehicle are a simple switch, a contact sensor, a photoelectric cell, a light barrier, a camera, an ultrasound sensor and a radar sensor. Such a sensor can transmit the detected data in the familiar fashion—for example, via wiring or a wireless connection such as radio or infrared—to a control device.

Detection of an attachment on or above the vehicle can also take place, in a simple and inexpensive embodiment, through an evaluation of data available in the vehicle—for example, the data of a tilt sensor, an acceleration sensor or other data characteristic of driving dynamics. Engine control data, consumption, efficiency or drag coefficient (cw value) can also be used to detect an attachment on or above the vehicle.

Alternatively, or additionally, the existence of an attachment on or above the vehicle can be input by a user by means of a data input unit. Data input can particularly be performed by the driver by means of a switch, a keyboard or voice input.

In other embodiments of the invention, the type of an attachment on or above the vehicle is detected, for example, by means of a transponder and used to determine the auxiliary variable. What is detected, for example, is whether a bicycle rack, a ski rack or a ski box is attached to the vehicle. Additionally, the type or model can be differentiated. In such a case, what is detected is whether a roof container made by manufacturer A or a roof container made by manufacturer B is located on the roof, and whether the detected roof container is model M or model L.

One variable affecting the wind load forces, and hence the closing resistance of the closing means, is the location of an attachment on or above the vehicle. For example, whether a roof container is attached 20 centimeters more to the front or 20 centimeters more to the rear can have a significant effect on the wind load forces acting on the vehicle, and particularly on the closing means. Likewise, the wind load forces can be modified as a function of whether a ski box is attached to the left or right of the vehicle. Therefore, in another embodiment of the invention, the location at which an attachment is arranged on or above the vehicle is detected. The detected fastening location is used to determine the auxiliary variable.

Apart from the wind load forces or an indicative variable thereof, variables affecting the closing force required for closing the sliding cover, such as e.g. the outside temperature, the vehicle interior temperature, the vehicle age or the duration since the last actuation of the closing device, can be used as additional auxiliary variables, in order to determine whether a crush situation exists. Alternatively, these variables can also be used to determine the auxiliary variable.

A preferred embodiment of the process according to the invention is provided in the description of the figure.

DETAILED DESCRIPTION OF THE INVENTION

Figure 1:
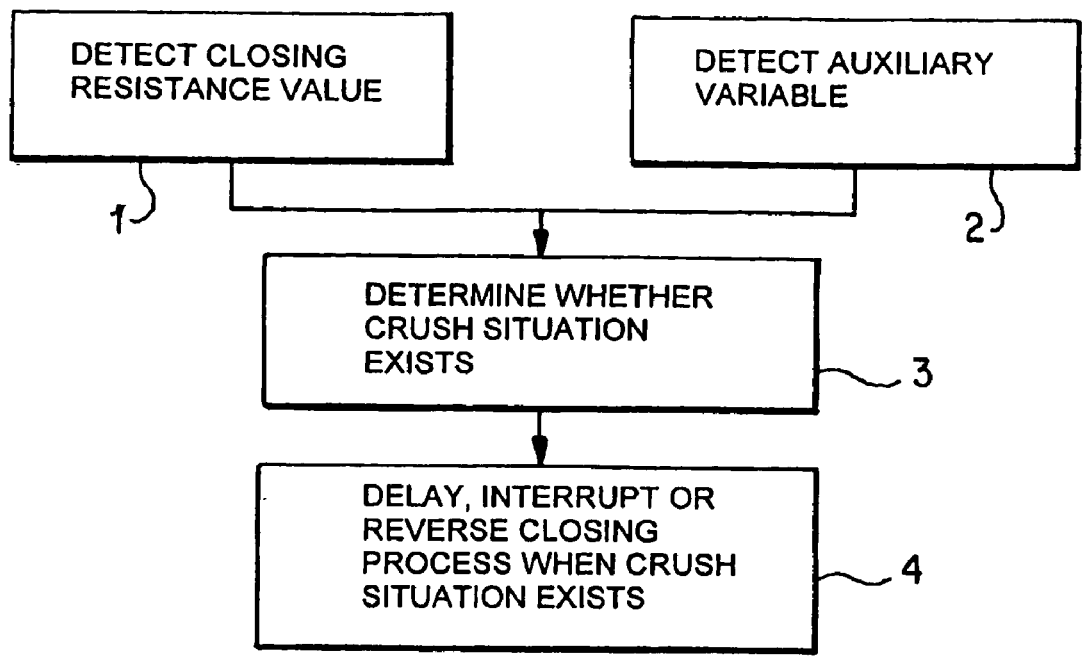
FIG. 1 depicts a flow chart of a process for controlling a sunroof in a motor vehicle, and FIG. 2 schematically illustrates a closing device such as a sunroof which may be controlled by a process according to the invention.
Figure 2:
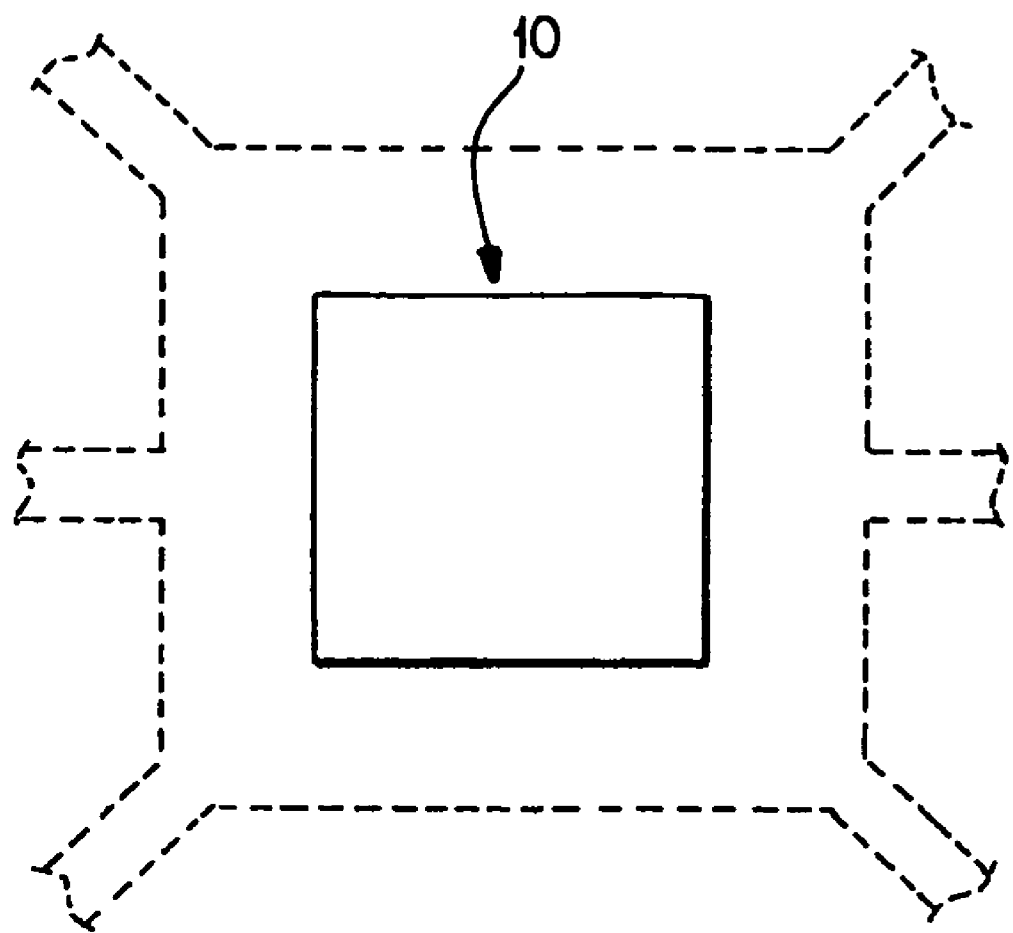

In step 1, a closing resistance value is detected. The closing resistance value can be, for example, the motor current of the electric driving motor of the closing device, such as the sunroof 10 schematically shown in FIG. 2.

Alternatively to the motor current, the closing resistance value can be another variable indicative of the force counteracting a closing motion of the sliding cover. Further examples of the closing resistance variable are the closing duration, the closing speed or the engine speed of the closing motor.

In step 2, an auxiliary variable is detected, which is indicative of the wind load forces occurring during a specified travel speed of the vehicle. The auxiliary variable is especially indicative of the wind load forces exerted on the sliding cover. A sensor switch, for example, detects whether a roof rack is attached to the vehicle roof. If necessary, additional variables that characterize the roof rack and the exact point of application, i.e. the location at which the roof rack is fastened, are detected. These detected pieces of information are stored or further processed in the form of an auxiliary variable, or are used to determine the auxiliary variable.

In step 3, the closing resistance value detected in step 1 is used to determine whether a crush situation exists. To this end, for example, a threshold value for the closing resistance variable is specified.

Alternatively, the time progression of the closing resistance value can be evaluated. For example, a threshold value can be specified for the increase in the closing resistance value.

In another alternative for determining a crush situation, the course of the determined closing resistance value is compared to a specifiable comparison curve, or a section of the recorded curve progression of the closing resistance variable is compared to a specifiable comparison curve section.

In order to determine whether a crush situation exists, the auxiliary variable determined in step 2 is used in step 3 in addition to the closing resistance variable. By means of the auxiliary variable, a correction value that should be subtracted from, or added to, or multiplied by the detected closing resistance variable is determined. By using the auxiliary variable, a correction value is determined, if necessary, for a detected roof rack, the detected type of the roof rack and the detected fastening location of the roof rack (e.g. ski box mounted on the left or roof container mounted on the right). By means of this correction value, the detected closing resistance variable is corrected in order to determine a crush situation reliably. In order to determine the correction value, the detected vehicle speed is preferably used.

As an alternative to a correction value for the detected closing resistance variable, for example, an additive or multiplicative correction value for a specified threshold value of the closing resistance variable or a correction value for a specified comparison curve can be determined by means of the auxiliary variable. In particular, the auxiliary variable itself can serve as the correction value.

A crush situation is concluded if the detected closing resistance variable is above the specified threshold value, or if the increase in the determined closing resistance variable exceeds a threshold value, or if the determined closing resistance curve deviates from a target curve specified as a comparison curve beyond a certain degree. Likewise, a crush situation can be deduced if the determined closing resistance curve is similar, to a specifiable extent, to a crush curve specifiable as a comparison curve.

If it is determined, in step 3, that a crush situation exists, the closing process is delayed, interrupted or reversed in step 4. An at least partial reversal of the closing operation has the particular advantage that, apart from improved protection from injuries, the crush situation is also eliminated and a crushed body part can be freed without difficulty. To reverse the closing operation, i.e. to open the locking device, the closing motor of the sliding cover is controlled in an opening mode.

The process according to the invention for controlling a closing device is particularly suited for closing devices such as sunroofs, tilt sunroofs, lamellar sunroofs or power windows. However, any other closing devices of the vehicle, which can be controlled during the travel of the vehicle and whose closing resistance can be influenced by wind load forces, can be controlled by means of the process according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for controlling a closing device in a motor vehicle driven by an electric motor to protect against crushing of a body part during a closing motion of a closing means of the closing device comprising:
   detecting a closing resistance variable which is characteristic of a force counteracting the closing motion of the closing means,
   detecting the existence of a vehicle attachment on or above the vehicle and using the existence detected to determine an auxiliary variable indicative of wind load forces exerted on the closing means at a certain speed,
   using the closing resistance variable and the additional auxiliary variable indicative of wind load forces exerted on the closing means at a certain speed to determine whether a crush situation exists, and
   initiating a protective measure when a crush situation exists.

2. A process for controlling a closing device in a motor vehicle driven by an electric motor to protect against crushing of a body part during a closing motion of a closing means of the closing device comprising:
   detecting a closing resistance variable which is characteristic of a force counteracting the closing motion of the closing means,
   detecting the nature of a vehicle attachment on or above the vehicle and using the nature detected to determine an auxiliary variable indicative of wind load forces exerted on the closing means at a certain speed,
   using the closing resistance variable and the additional auxiliary variable indicative of wind load forces exerted on the closing means at a certain speed to determine whether a crush situation exists, and
   initiating a protective measure when a crush situation exists.

3. A process for controlling a closing device in a motor vehicle driven by an electric motor to protect against crushing of a body part during a closing motion of a closing means of the closing device comprising:
   detecting a closing resistance variable which is characteristic of a force counteracting the closing motion of the closing means,
   detecting the type or model of a vehicle attachment on or above the vehicle and using the nature detected to determine an auxiliary variable indicative of wind load forces exerted on the closing means at a certain speed,
   using the closing resistance variable and the additional auxiliary variable indicative of wind load forces exerted on the closing means at a certain speed to determine whether a crush situation exists, and
   initiating a protective measure when a crush situation exists.

4. A process for controlling a closing device in a motor vehicle driven by an electric motor to protect against crushing of a body part during a closing motion of a closing means of the closing device comprising:
   detecting a closing resistance variable which is characteristic of a force counteracting the closing motion of the closing means,
   detecting a fastening location of a vehicle attachment on or above the vehicle and using the nature detected to determine an auxiliary variable indicative of wind load forces exerted on the closing means at a certain speed,
   using the closing resistance variable and the additional auxiliary variable indicative of wind load forces exerted on the closing means at a certain speed to determine whether a crush situation exists, and
   initiating a protective measure when a crush situation exists.

5. The process for controlling a locking device according to claim 1, wherein the closing device is a motor vehicle sunroof.

6. The process for controlling a closing device according to claim 1, wherein the closing resistance variable is a motor current of an electric driving motor of the closing device.

7. The process for controlling a closing device according to claim 2, wherein the closing resistance variable is a motor current of an electric driving motor of the closing device.

8. The process for controlling a closing device according to claim 3, wherein the closing resistance variable is a motor current of an electric driving motor of the closing device.

9. The process for controlling a closing device according to claim 4, wherein the closing resistance variable is a motor current of an electric driving motor of the closing device.

10. The process for controlling a closing device according to claim 2, wherein the closing device is a motor vehicle sunroof.

11. The process for controlling a closing device according to claim 3, wherein the closing device is a motor vehicle sunroof.

12. The process for controlling a closing device according to claim 4, wherein the closing device is a motor vehicle sunroof.

* * * * *